B. P. ROACH.
DENTAL FLOSS HOLDER.
APPLICATION FILED APR. 24, 1916.
1,210,207.
Patented Dec. 26, 1916.
Fig. 1.
Fig. 3.
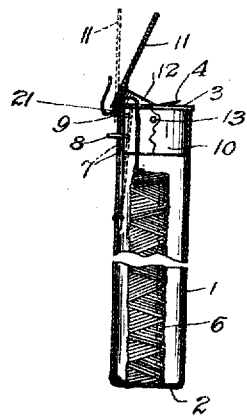
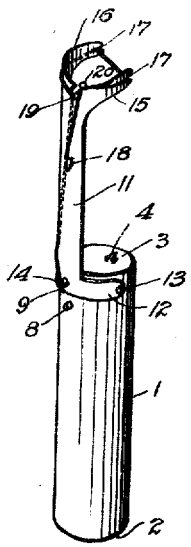
Fig. 2.
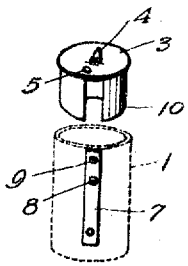
Fig. 4.
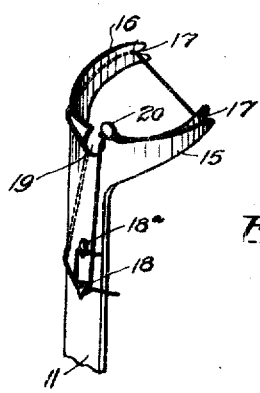
Fig. 5.
Inventor
Benjamin P. Roach.
Witness
By
Attorney

UNITED STATES PATENT OFFICE.

BENJAMIN P. ROACH, OF BIRMINGHAM, ALABAMA.

DENTAL-FLOSS HOLDER.

1,210,207.  Specification of Letters Patent.  Patented Dec. 26, 1916.

Application filed April 24, 1916. Serial No. 93,259.

*To all whom it may concern:*

Be it known that I, BENJAMIN P. ROACH, a citizen of the United States of America, residing at Birmingham, in the county of Jefferson and State of Alabama, have invented certain new and useful Improvements in Dental-Floss Holders of which the following is a specification.

My invention relates to a dental appliance which is intended to hold a strand of dental floss so that it can be worked between the teeth without requiring the operator to insert his fingers in the mouth as is the present practice.

In its preferred form, I have designed my appliance with a tubular handle which is adapted to contain the dental floss so wound that it may be drawn out through the top closure in the same manner as floss is now drawn from the containers in which it is sold on the market. This tubular handle carries a floss holder which at its rear end is semi-circular in cross section and hinged to the handle so as to be moved into alinement therewith, in which position it will clamp the dental floss between it and the handle, leaving a free end which is wound about a yoke at the outer end of the holder in such manner as to present the floss in convenient manner for being manipulated in the mouth. If desired, the holder can be used without the handle by providing a suitable clamp means thereon to take the place of the clamp formed by the holder and handle and hold one end of the floss firmly.

My invention comprises, among other features, the novel manner in which the free end of the dental floss is made fast to the holder after being wound thereon, and also the manner in which the holder itself is shaped to fold down against the handle for convenience in shipment and storage.

My invention also comprises other novel details of construction and arrangements of parts, which in their preferred embodiment only are illustrated in the accompanying drawings, which form a part of this specification, and in which:—

Figure 1 shows my appliance in perspective view with the yoke arm and floss in operating position. Fig. 2 shows the appliance with the holder arm in collapsed position. Fig. 3 is a vertical section through the handle showing the holder arm moving into position to clamp the floss. Fig. 4 is a detail view of the cap and spring, the latter being shown in connection with the dotted parts of the handle. Fig. 5 is an enlarged view of the yoke end floss holder with a modified arrangement for clamping both ends of the floss.

Similar reference numerals refer to similar parts throughout the drawings.

As illustrated in Figs. 1 to 4, the appliance comprises a tubular handle 1 having its lower end 2 closed and having at its upper end a removable cap 3 which has a punched up floss cutter 4 on one side and on the other side an opening 5 through which the floss is adapted to be drawn off from a coil or spool 6 thereof within the handle. Mounted within the handle near its upper end is a flat spring 7, disposed axially of the handle and carrying a push button 8 at an intermediate point and at its free end a latch pin 9. Both the pin and push button work through suitable openings in the handle and project beyond the same, the catch pin being disposed near the end and slightly beveled on one side. The cap 3 has its flange 10 cut away so as to clear the spring, which latter, by engaging the side walls of the notch, will prevent the cap from rotating and hold the opening 5 for the floss at the point desired. I connect to the handle a floss holding arm 11 which is formed by a curved plate struck on an arc substantially concentric with the axis of the handle 1 which is cylindrical. At the rear end of the arm I provide two oppositely projecting curved flanges 12, which with the arm form a half circle in cross section. The free ends of these flanges 12 are pivotally connected by pins or rivets 13 to the top of the handle in such position that the half circular portion of the arm will swing on its pivots to bring the arm either into alinement with the handle, when in extended position, or to permit it to fold down against the casing when collapsed. The arm has an opening 14 which is adapted to slide over and to receive the catch pin 9 which is automatically tripped by the arm striking its beveled face. The pin 9 thus serves to hold the arm 11 in operating position. At its outer or yoked end the arm is provided with curved yoke members 15 and 16, which, together with the arm, form a half circle, but which are inclined forwardly so that their free ends stand well beyond the end of the arm. The ends of the yoke arms 15 and 16 are notched at 17 to receive and hold the dental floss and a clamp and cutter lip 18 is stamped up at an intermediate point on the arm. At the forward end of the arm I cut out a notch 19 which opens through the outer end of the arm and at one side of this notch I provide a stud 20. The opening in the cap 3 for the dental floss is disposed adjacent and on the left side of the arm 11 when the latter is in the position shown in Fig. 1.

In operation, assuming the handle 1 charged with the dental floss and the arm 11 in collapsed position (Fig. 2) or far enough over to permit the end of the floss to be grasped behind its rear ends. A length of the floss is then drawn out through the opening 5 and the holder arm 11 is swung back to the position shown in Fig. 1, in doing which it clamps the portion 21 (Fig. 3) of the floss between it and the handle and securely holds it. The free end of the floss is then brought around under and forward along the arm 11, then up and out through the notch 19, then down around the outer face of the curved yoke arm 16 and through its notch 17, then stretched across the neck of the yoke, then caught in the notch of the arm 15 and passed up around the outside thereof until it comes opposite the stud 20. Here it is brought under and looped around the stud 20 and then brought up through the notch 19 and along the outside of the arm 11 and caught under the clamp and cutter 18, where a sharp pull will shear its free end, leaving it caught under the clamp. The apparatus is then ready for use and is inserted in the mouth of the patient, the floss being held conveniently in position, between the yoke arms 15 and 16, to be worked freely between the teeth. After use, the end of the floss is released from the clamp 18 and unwound from the yoke, the push button 8 is depressed and the arm swung forward, after which the end of the floss which has been in use is cut off by means of a cutter 4 and a new strand drawn out and wound into position on the yoke arm.

In Fig. 5 I show a modified form of holding arm which may be used independently of the handle 1 and which is provided with a different means from that already described for holding the floss in position on the yoke end of the arm. In this construction the arm is provided in addition to the clamp member 18 with a similar and reversely disposed clamp and cutter lip 18ª. In this arrangement one end of the floss is caught under the clamp lip 18 and is then passed around the yoke in the manner already described and its free end is brought back and passed first around the clamp lip 18ª and then around the clamp lip 18 and snapped off. It will be noted that the tensions of the two lapping strands under the lip 18 are opposite to each other so that the outer strand tends to hold the inner end tightly in position. This is necessary to prevent the pull on the floss working that end aloose.

It is desirable that the handle 1 should be adapted to receive the ordinary holders for dental floss but it is obvious that the floss could be purchased in coils at a reduced cost and these used to charge the container.

The device when collapsed takes up but little more room than the ordinary dental floss holder and in practice it effects a material saving in the quantity of floss consumed, as only a small amount is required to be drawn off to thread the yoke arm and but very little more than the portion actually used is thrown away.

Having thus described my invention, what I claim as new and desire to secure by Letters Patent, is:—

1. A floss holder having divergent arms at one end forming a yoke, a floss guide notch in the end of each arm, a floss guide at the crotch of the yoke for directing the floss with approximately a right angle turn to one side of the yoke, a short post-like extension at the end of the holder about which the returning end of a strand of floss is adapted to be wrapped, and clamp means on the holder spaced from the post-like extension and adapted to receive and hold the ends of the strand of floss in service on the holder.

2. A dental floss holder comprising a member having at one end laterally and outwardly curved divergent arms forming a yoke, floss guide notches at the ends of the yoke arms, and a guide and double fastening means for the floss at the end of said member comprising a guide about which one end of the strand of floss can be passed upwardly and guided over the outer side of one yoke arm, a stud lying in the plane of the arm and disposed to receive and have the floss wound about it the other end of the floss strand after crossing the yoke and passing up along the other yoke arm, and means spaced from the end of said member and adapted to receive and hold the ends of the floss strand.

3. A dental floss holder comprising a tubular floss holding handle, a member hinged to the handle and adapted to fold against it, a yoke on said member formed by divergent arms adapted to embrace and clasp the handle in folded position, and means to hold a strand of floss stretched across the ends of said yoke arms.

4. A dental floss holder comprising a handle, a yoke arm connected to the handle and adapted with the handle to form a clamp for one end of a piece of dental floss, said arm having at its outer end a yoke and a guide, said guide being in position to hold the floss disposed to be passed around one arm of the yoke, a stud adapted to receive the floss after it has been passed across the neck of the yoke and around the other yoke arm, and a clamp near the end of the arm to receive and hold the free end of the floss.

5. In a dental floss holder, in combination, a tubular handle adapted to contain a coil of dental floss, said handle having an opening through which the floss can be drawn out, an arm comprising a yoke-like member at one end pivoted to the handle and adapted to receive and clamp the floss between it and the handle, a yoke at the other end of said arm, there being a notch, a stud, and a clamp near the free yoke end of the arm for guiding and holding the floss stretched across the neck of the yoke.

6. In a dental floss holder, a tubular container adapted to contain a coil of floss and forming a handle and having an apertured closure at one end through which the floss is drawn out, an arm carrying a yoke-like member pivoted near said closure, and said yoke-like member being adapted in one position to engage one side of the end of the container and form therewith a floss clamp, and in its other position to swing over and fold against the other side of the container, a yoke-like member at the free end of said arm, and means to guide and hold a strand around said latter yoke-like member, substantially as described.

7. In a dental floss holder, a tubular container adapted to contain a coil of floss and forming a handle portion, an arm pivoted to one end of said holder, which holder end is provided with an opening through which the floss is drawn out, said arm having substantially semi-circular yoke-like members at each end, one yoke end being pivoted to the container in position to permit the arm to be swung into line with the container or to be swung into collapsed position against the container, catch means to hold the arm in its extended position, and means to guide and fasten a strand of floss about the free yoke end of the arm, substantially as described.

8. In combination, a tubular floss holder open at one end, an apertured closure for said end, a floss bearing member formed by a metal arm curved in cross section throughout and provided at each end with yoke arms, the arms at one end being pivoted to the holder near said closure and adapted to swing over the end of the holder, the arms at the outer end having end notches and there being a notch in the free end of the arm, a stud near said latter notch, and floss clamping means on the arm.

9. A dental floss holder comprising an arm formed of sheet metal arched in transverse cross section and having an integral floss clamping and cutting lip struck up therefrom, divergent curved yoke arms with end notches, there being a notch midway between the yoke arms, an integral post about which one end of the strand is adapted to be wrapped after being passed over the yoke and from which it is passed through said middle notch and back to the lip, means to hold one end of the strand in position to be passed along under the arm and upwardly through said middle notch before passing to the yoke, and a clamp means on the arm to receive the free end of the strand, substantially as described.

In testimony whereof I affix my signature.

BENJAMIN P. ROACH.

Witness:
 NOMIE WELSH.